Patented Dec. 11, 1951

2,577,847

UNITED STATES PATENT OFFICE 2,577,847

PURIFICATION OF CHLOROCARBONS

Patrick Anthony Florio, Woodside, and John Douglas Calfee, Manhasset, N. Y., assignors to Allied Chemical & Dye Corporation, New York, N. Y., a corporation of New York No Drawing. Application October 16, 1948, Serial No. 55,024

13 Claims. (Cl. 260—654)

This invention relates to the purification of the chlorocarbons, $CCl_2=CCl_2$ and $CCl_4$. More particularly, the invention is directed to the purification of such compounds obtained by chlorinolysis (i. e. high temperature exhaustive chlorination resulting in the rupture of the carbon to carbon bond) of 1,1-difluoroethanes such as ethylidene fluoride.

In certain processes involving elevated temperature chlorinolysis of 1,1-difluoroethanes such as $CH_3CHF_2$, and fractionation of the chlorinolysis reaction product, substantial yields of $CCl_2=CCl_2$ and $CCl_4$ are obtained. These chlorocarbons, after recovery in crude form from the chlorinolysis reaction mixture, contain as impurities small but nevertheless deleterious amounts of chemically active organic fluorine containing materials, in particular hydrolyzable chlorofluoroethylenes such as $CCl_2=CClF$. The products, $CCl_2=CCl_2$ and $CCl_4$, are in demand for use as dry-cleaning solvents and have important commercial applications provided they are in a form sufficiently pure. The boiling points of the troublesome organic fluorine containing materials are sufficiently close to those of $CCl_2=CCl_2$ and $CCl_4$ to render purification by fractionation difficult and expensive to carry out commercially. In particular, one of the chlorofluoroethylenes normally obtained in appreciable amounts, $CCl_2=CClF$, boils at a temperature (71° C.) sufficiently close to that of the $CCl_4$ (77° C.) to render complete separation of these two materials quite difficult. Further, the boiling point of $CCl_2=CClF$ is near enough to the boiling point of $CCl_2=CCl_2$ (121° C.) so that separation of the last small traces of this impurity from the $CCl_2=CCl_2$ by fractionation is not feasible. Impure chlorocarbons produced by chlorinolysis of 1,1-difluoroethanes may contain chemically active organic fluorine containing compounds (such as hydrolyzable chlorofluoroethylenes) in amount such that the fluorine content is substantially greater than 0.02 weight per cent. For example, crude $CCl_2=CCl_2$ may contain chlorofluoroethylene impurities in quantity such that the fluorine content is as much as 0.2% or more, and in the case of crude $CCl_4$, the corresponding fluorine value may be even higher. These chemically active fluorine compound impurities even when present in the chlorocarbon in these very small quantities undergo slow hydrolysis and/or oxidation upon standing resulting in the evolution of acidic materials including HF and/or HCl, and impart a pungent, phosgenic odor to the chlorocarbon. The hydrolysis or oxidation products thus evolved also cause serious corrosion of glass or metal containers in which the chlorocarbon is stored. These properties are undesirable, particularly from the standpoint of using the $CCl_2=CCl_2$ and $CCl_4$ as dry-cleaning solvents.

Purification of $CCl_2=CCl_2$ and $CCl_4$ heretofore produced by non-chlorinolysis prior art processes has presented different problems due to the different nature of the impurities to be removed. Accordingly, it has been found necessary to devise other improved methods for the purification of $CCl_2=CCl_2$ and $CCl_4$ formed by chlorinolysis of 1,1-difluoroethanes, and it is an object of this invention to afford procedures to accomplish this purpose. For some uses of the subject chlorocarbons, it may be desirable merely to effect substantial reduction of the content of chemically active fluorine containing materials. For other uses where specifications are stringent, it may be necessary to reduce content of these impurities to a degree such that the fluorine content of the chlorocarbon is less than .02 percent, and objectionable odor and corrosiveness of the chlorocarbons are substantially absent. Accordingly, it is a particular object of the invention to produce chlorocarbons meeting these specifications.

We have found that the purification of the chlorocarbons $CCl_2=CCl_2$ and $CCl_4$ containing as impurity such fluorine containing materials, e. g. $CCl_2=CClF$, which chlorocarbons are preferably those which may be obtained by chlorinolysis of a 1,1-difluoroethane, may be effected by subjecting the chlorocarbon to the action of an inorganic oxygenated silicon compound. By such procedure, hereinafter more fully described, if desired the fluorine content may be reduced advantageously to less than .02%, and the objectionable odor and the corrosive characteristics of the subject chlorocarbons may be removed.

The agents which are effective in the purification of chlorocarbons according to our invention are inorganic oxygenated silicon compounds which may be any form of silica per se ($SiO_2$) or which contain silica in free or chemically combined form. For example, silicic acid is a preferred agent. It is known that silicic acid exists in many forms each differing chemically from the other in the degree of hydration, i. e. the amount of water found in the molecule. Beginning with ortho-silicic acid, $H_4SiO_4$, one may progressively remove water from the molecule, obtaining with each dehydration step a different dehydration derivative of silicic acid, and eventually, substantially pure silica. Thus, ortho-silicic acid or any of the dehydration derivatives thereof may be employed as purification agents. Commercially obtainable silica gel is another preferred purifying agent. Glass wool, granulated or ground glass or diatomaceous earth may also be employed to advantage. Aluminum silicate, and calcined clays may be employed. The presence of moderate amounts of free water in the treating agents does not appear deleterious. All of the foregoing materials, e. g., silica, silicic acids, silicates and mixtures thereof, are particularly active in effecting the objectives of the invention.

Although not essential to successful practice of our invention, it is advantageous to employ treating agent in a form which has a large surface exposed to the chlorocarbon undergoing treatment, e. g. silicic acid in pellets or powder form, silica gel in pellet or granular form, and glass or non-activated silica, aluminum silicate, calcined clays and diatomaceous earth in ground or finely divided form are suitable for application to our process.

The amount of purifying agent to be employed in proportion to the amount of chlorocarbon undergoing treatment may vary considerably according to the particular agent, the state of subdivision of the agent, the degree of agitation and turbulence in the liquid being processed, the temperature and other factors. Some destruction of undesirable orgnanic fluorine containing material is obtained with very small amounts of purifying agent, e. g. 1-2 weight percent or less based on the weight of the liquid material being treated. On the other hand, although to no particular advantage, very large amounts of agent of the order of 50 percent or more may be employed without adversely affecting either the chlorocarbon or the silicon compound. Usually, we find that adequate purification can be obtained when the amount of treating agent used is about 3-15 weight percent of the body of chlorocarbon undergoing treatment. Ordinarily consumption of the agent during the purification operation is negligible, and hence the agent may be recovered and used repeatedly without noticeable decrease in effectiveness.

The temperature at which the chlorocarbon is subjected to the action of the silicon compound may vary over wide limits. To obtain rapidity of reaction, we usually employ elevated temperatures, i. e. above 50° C. and below those temperatures at which decomposition of the chlorocarbon undergoing treatment begins. We find, however, that at temperatures above 60° C. reaction rates sufficiently high for economical operation may be obtained while temperatures above 150° C. are ordinarily of insubstantial additional benefit, and accordingly temperatures in the range 60° C. to 150° C. are suitable. To facilitate contact of the chlorocarbon undergoing treatment with the purifying agent, it is desirable to agitate the liquid. Such agitation may be obtained by stirring or by employing other well known means. A particular procedure for carrying out the invention is to boil, under substantially 100% reflux conditions, a body of the chlorocarbon liquor containing the purifying agent. In this manner of operation, adequate treatment temperature and agitation may be had simultaneously.

The pressure maintained during the treating operation may be anything desired or suitable. If, as in the above procedure, the chlorocarbon is subjected to boiling, the pressure maintained may be that at which the material boils at the desired temperature which should not exceed the decomposition temperature of the particular chlorocarbon.

The time of treatment may vary according to the temperature, the amount of chemically active organic fluorine containing impurity present, the degree of purification desired, and to some extent upon the particular silica compound employed and its state of subdivision. Some destruction of undesired material may be effected in only a few minutes, but more usually 2 to 4 hours are allowed. For any particular impure chlorocarbon starting material and any particular set of operating conditions, time of contact to effect the desired degree of purification may be determined by making suitable test operations and determining corrosiveness, odor and fluorine content of the product.

As heretofore mentioned its is preferable to conduct the purification under treating agent-temperature-time conditions which yield a product having less than .02% fluorine, negligible pungent phosgenic odor and negligible corrosive effect. Accordingly, for a given purifying agent and temperature, heating time is prolonged until a test sample shows a fluorine content of 0.02% or less. Corrosiveness may be determined by placing a small sample of chlorocarbon in a glass container and maintaining the container at 50° C. Chlorocarbon showing imperceptible corrosive attack when stored indefinitely under these conditions may be obtained according to preferred embodiments of our invention, whereas impure chlorocarbon produces a visible attack on the glass in 12 hours.

The manner in which the treating agents bring about the removal of undesirable fluorine compounds in the process of our invention is not known to us. We believe that the agents cause destruction, i. e. chemical decomposition of these impurities. It is possible that hydrolysis of the fluorine compounds is effected or the fluorine compounds are otherwise destroyed liberating HF while the purifying agent is simultaneously converted by the HF to silicon halides or silicon oxyhalides. However, we do not intend to limit our invention to any particular mechanism of reaction or theory of operation of the purifying agent.

While particular embodiments of our invention heretofore described comprise treating the chlorocarbon in batch processes, our invention is not limited to batchwise operation. Chlorocarbon may be subjected to the action of the purifying agent in continuous processes, e. g. by passing the chlorocarbon to be treated through a pipe or other conduit packed with silicon compound treating agent maintained at the desired treating temperature. In such operation, the desired agitation may be obtained by turbulence of liquid flow.

Following the treating operation heretofore described, the reaction mixture is cooled and the treating agent is separated from the chlorocarbon by well known mechanical means such as filtration or decantation. Thereafter the material obtained is fractionated and the purified chlorocarbon recovered. During the treatment of the chlorocarbon, some acidic materail such as HCl or HF may be formed. These acidic materials may be separated by the fractionation procedure, but according to a particular embodiment of the invention we effect separation subsequent to the removal of the silicon compound from the chlorocarbon and prior to the fractionation. According to the latter procedure we first decant supernatant liquid from the treating agent, then remove acidic materials by extraction or neutralization, then remove any water present in the material, and finally subject the material to fractionation to recover purified chlorocarbon. Water or other aqueous media are suitable for extraction of acids. If it is desired to neutralize the acids, solid neutralizing agents such as soda ash or liquid agents such as aqueous alkaline solutions may be employed. The chlorocarbons may be dehydrated by drying over calcium chloride.

The treatment of the chlorocarbon may be carried out in a vessel made of any of the usual materials of construction which resist attack by HF and HCl. We prefer apparatus constructed of bonded graphitic material such as is commonly known as "Karbate."

In accordance with a modification, the process of the invention may be carried out in an apparatus comprising a boiling pot and a superjacent column which may be packed in suitable manner with the purifying agent to be used. In the practice of this modification, the liquor in the pot is boiled, vapors rise into the column and into contact with the purifying material. The overhead vapors are condensed and returned as reflux to the column. According to this practice, chlorocarbon undergoing treatment is simultaneously contacted in the form of vapor and liquid (condensate) streams, preferably countercurrently, with the treating agent at temperatures heretofore described. Preferably, the column is operated under conditions of high (e. g. substantially 100%) reflux to afford adequate time interval for treatment. The HF and HCl acidic materials may be bled out of the top of the column during or subsequent to refluxing, and thereafter the acid-free treated chlorocarbon may be recovered. Alternatively, after suitable treatment of chlorocarbon vapor and liquid with silicon compound, the HF and HCl may be distilled overhead simultaneously with the chlorocarbon, and separated therefrom by subsequent distillation procedures.

The following examples are illustrative of our invention, the parts being by weight:

Example 1.—A crude product from the chlorinolysis of $CH_3$—$CHF_2$ was fractionally distilled and a fraction boiling in the range 115°–122° C. was recovered. This material contained essentially $CCl_2$=$CCl_2$ and chemically active organic fluorine containing materials. It had a pungent, phosgenic odor, when stored at 50° C. in a glass container, caused visible attack on the glass in 24 hours, and contained 0.07% fluorine by analysis. 5 parts of partially dehydrated silicic acid in powder form, sold commercially as "silicic acid" were added to 100 parts of this fraction and the mixture was refluxed at atmospheric pressure for 4 hours. Following contact with the silicic acid, the $CCl_2$=$CCl_2$ was cooled, the silicic acid separated by decantation, and the liquid washed with a dilute solution of sodium hydroxide and with water. It was then dried over calcium chloride and fractionally distilled. 90 parts of $CCl_2$=$CCl_2$ boiling over the range 120.5 to 121.0° C. were recovered which had no pungent phosgenic odor and did not attack glass when held indefinitely at 50° C. in a glass container. The fluorine content of the purified material was less than 0.02%.

Example 2.—A vacuum jacketed laboratory distillation column 30" long and ½" in diameter, was packed with 75% ⅛ inch glass helices, and 25% #4 mesh silica gel which had been dried at 120° C. overnight. 200 parts of crude $C_2Cl_4$ obtained from the chlorinolysis of $CH_3$—$CHF_2$ were placed in the still pot and refluxed through the distillation column for a period of 35 minutes after which time distillate was collected. After drawing off and discarding a small foreshots fraction, 180 parts of distillate were collected which had no pungent odor and did not attack glass when held for 60 hours at 50° C. in a glass container. The fluorine content of the purified material was less than 0.02%.

Example 3.—5 parts of calcined clay (aluminum silicate) were added to 100 parts of the fraction described in Example 1 and the mixture was refluxed at atmospheric pressure for 4 hours. Following contact with the clay the $CCl_2$=$CCl_2$ was cooled, the clay separated by decantation and filtration and the liquid washed with a dilute solution of sodium hydroxide and with water. It was then dried over calcium chloride and fractionally distilled. 92 parts of $CCl_2$=$CCl_2$ boiling over the range 119.8 to 120.5° C. were recovered which had no pungent phosgenic odor and did not attack glass when held for 75 hours at 50° C. in a glass container. The fluorine content of the purified material was less than 0.02%.

Example 4.—5 parts by weight of finely subdivided glass were added to 100 parts of the fraction described in Example 1 and the mixture was refluxed at atmospheric pressure for 2 hours. Following contact with the glass the $CCl_2$=$CCl_2$ was cooled, allowed to remain overnight at room temperature, the glass separated by decantation, and the liquid washed with a dilute solution of sodium hydroxide and with water. It was then dried over calcium chloride and fractionally distilled. 90 parts of $CCl_2$=$CCl_2$ boiling over the range 120.5 to 121.0° C. were recovered which had no pungent phosgenic odor and did not attack glass when held for 80 hours at 50° C. in a glass container. The fluorine content of the purified material by chemical analysis was less than 0.02%.

Example 5.—An impure carbon tetrachloride contained about 0.49% by weight of $CCl_2$=$CClF$ (0.07% fluorine by analysis), had a pungent phosgenic odor and when stored in a glass container at 50° C. caused visible attack on the glass in 24 hours. 100 parts of this material were mixed with 5 parts of silicic acid of the type described in Example 1 and then refluxed at atmospheric pressure for 4 hours. Following contact with the silicic acid, the $CCl_4$ was cooled, the silicic acid separated by decantation, and the liquid washed with a dilute solution of sodium hydroxide and with water. It was then dried over calcium chloride and fractionally distilled. 90 parts of $CCl_4$ boiling over the range of 75 to 76° C. were recovered which had no pungent odor and did not attack glass when held for 85 hours at 50° C. in a glass container. The fluorine content of the purified material was less than 0.02%.

Example 6.—5 parts of diatomaceous earth were added to 100 parts of the fraction described in Example 1 and the mixture was refluxed at atmospheric pressure for 4 hours. Thereafter the $CCl_2$=$CCl_2$ was cooled, the diatomaceous earth separated by decantation, and the liquid washed with dilute solution of sodium hydroxide and with water. It was then dried over calcium chloride and fractionally distilled. 90 parts of $CCl_2$=$CCl_2$ boiling over the range 120.3 to 121.0° C. were recovered which had no pungent odor and did not attack glass when held for 60 hours at 50° C. in glass container. The fluorine content of the purified material was less than 0.02%.

Example 7.—100 parts of a crude product from the chlorinolysis of $CH_3$—$CHF_2$, substantially the same as employed in Example 1, which product contained about 0.5% by weight of $CCl_2=CClF$, and approximately 87% of which product boiled in the range 116–122° C., were charged to an all metal still comprising a steel reboiler equipped with a steel column. The lower portion of the column was packed with steel Raschig rings, and the upper portion was packed with 20 parts of silica gel beads. The crude product was boiled, overhead vapors were condensed in an externally cooled nickel pipe packed with steel rings, and substantially all the condensate was returned as reflux to the top of the column for a period of 180 minutes. Thereafter, distillate was collected until substantially all of the liquid has been removed from the reboiler. The distillate was subsequently purified by neutralization, washing, drying and fractionation procedures described in Example 1. 89 parts of $CCl_2=CCl_2$ boiling in the range of 120.5 to 121.0° C. were obtained which had no pungent phosgenic odor and did not attack glass when held for 110 hours at 50° C. in a glass container. The fluorine content of the purified material was less than 0.02%.

We claim:

1. In the purification of a chlorocarbon of the group consisting of $CCl_2=CCl_2$ and $CCl_4$ containing as impurity a chemically active organic fluorine containing material, the step of subjecting said chlorocarbon and said fluorine impurity to the action of an agent of the group consisting of silica, silicic acids, silicates and mixtures thereof at temperature in the range of approximately 50–150° C. and for a time sufficient to effect substantial interaction of said impurity with said agent and to substantially reduce the said impurity content of said chlorocarbon, separating the resulting chlorocarbon from said treating agent, and distilling from the treated chlorocarbon a purified product.

2. In the purification of a chlorocarbon of the group consisting of $CCl_2=CCl_2$ and $CCl_4$ containing as impurity a chemically active organic fluorine containing material, the step of subjecting said chlorocarbon and said fluorine impurity to the action of an agent of the group consisting of silica, silicic acids, silicates and mixtures thereof at temperature in the range of approximately 60–150° C. and for a time sufficient to effect substantial interaction of said impurity with said agent and to substantially reduce the said impurity content of said chlorocarbon, separating the resulting chlorocarbon from said treating agent, and distilling from the treated chlorocarbon a purified product.

3. In the purification of a chlorocarbon of the group consisting of $CCl_2=CCl_2$ and $CCl_4$ containing as impurity a chemically active organic fluorine containing material, the step of subjecting said chlorocarbon and said fluorine impurity to the action of a silicic acid at temperature in the range of approximately 50–150° C. and for a time sufficient to effect substantial interaction of said impurity with said silicic acid and to substantially reduce the said impurity content of said chlorocarbon, separating the resulting chlorocarbon from said treating agent, and distilling from the treated chlorocarbon a purified product.

4. In the purification of a chlorocarbon of the group consisting of $CCl_2=CCl_2$ and $CCl_4$ containing as impurity a chemically active organic fluorine containing material, the step of subjecting said chlorocarbon and said fluorine impurity to the action of silica gel at temperature in the range of approximately 50–150° C. and for a time sufficient to effect substantial interaction of said impurity with said silica gel and to substantially reduce the said impurity content of said chlorocarbon, separating the resulting chlorocarbon from said treating agent, and distilling from the treated chlorocarbon a purified product.

5. In the purification of a chlorocarbon of the group consisting of $CCl_2=CCl_2$ and $CCl_4$ containing an organic fluorine impurity and obtained by chlorinolysis of a 1,1-difluoroethane, the step of contacting said chlorocarbon and impurity in the form of vapor and liquid streams simultaneously, with an agent of the group consisting of silica, silicic acids, silicates and mixtures thereof at temperature in the range of 60–150° C. for a time sufficient to effect substantial interaction of said impurity with said agent and to substantially reduce the said impurity content of said chlorocarbon, separating the resulting chlorocarbon from said treating agent and distilling from the treated chlorocarbon a purified product.

6. The process of purifying a $CCl_2=CCl_2$ fraction obtained by fractionation of a chlorinolysis reaction product of a 1,1-difluoroethane, said fraction containing organic fluorine impurity in amount greater than 0.02% by weight of fluorine, which process comprises contacting said fraction with an agent of the group consisting of silica, silicic acids, silicates and mixtures thereof at temperature in the range of 60–150° C. for a time to effect interaction of said impurity with said agent sufficient to effect ultimate reduction of said impurity content of said fraction to less than 0.02% by weight of fluorine, removing said treating agent from said $CCl_2=CCl_2$ fraction and distilling from said fraction a purified $CCl_2=CCl_2$ product containing less than 0.02% by weight of fluorine.

7. The process of purifying a $CCl_2=CCl_2$ fraction obtained by fractionation of the chlorinolysis reaction product of a 1,1-difluoroethane, said fraction containing organic fluorine impurity in amount greater than 0.02% by weight of fluorine, which process comprises adding to said fraction a silicic acid in amount of 3–15% by weight of said fraction, heating said fraction in the liquid phase in the presence of said silicic acid at about the atmospheric boiling temperature of said fraction under substantially 100% reflux conditions and for a time to effect interaction of said impurity with said silicic acid sufficient to effect ultimate reduction of said impurity content of said fraction to less than 0.02% by weight of fluorine, separating said silicic acid from said fraction, extracting said fraction with an aqueous medium and distilling from the silicic acid treated fraction a purified $CCl_2=CCl_2$ product containing less than 0.02% by weight of fluorine.

8. The process of purifying a $CCl_2=CCl_2$ fraction obtained by fractionation of the chlorinolysis reaction product of a 1,1-difluoroethane, said fraction containing organic fluorine impurity in amount greater than 0.02% by weight of fluorine, which process comprises adding to said fraction silica gel, in amount of 3–15% by weight of said fraction, heating said fraction in the liquid phase in the presence of said silica gel at about the atmospheric boiling temperature of said fraction under substantially 100% reflux conditions and for a time to effect interaction of said impurity with said silica gel sufficient to effect ultimate reduction of said impurity content of said fraction to less than 0.02% by weight of fluorine, separating said silica gel from said fraction, extracting said fraction with an aqueous medium, and distilling from the silica gel treated fraction a purified CCl$_2$=CCl$_2$ product containing less than 0.02% by weight of fluorine.

9. The process of purifying a CCl$_2$=CCl$_2$ composition obtained by fractionation of the chlorinolysis reaction product of a 1,1-difluoroethane, said composition containing organic fluorine impurity in amount greater than 0.02% by weight of fluorine, which process comprises the procedure of forming vapors of said composition, condensing part of said vapors, and simultaneously contacting resulting condensate and uncondensed vapors with silica gel at about the atmospheric boiling temperature of said composition, and continuing said procedure for a time to effect interaction of said impurity with said silica gel sufficient to effect ultimate reduction of said impurity content of said composition to less than 0.02% by weight of fluorine, separating said composition from said silica gel, and distilling from the separated composition a purified CCl$_2$=CCl$_2$ product containing less than 0.02% by weight of fluorine.

10. The process of purifying a CCl$_2$=CCl$_2$ composition obtained by fractionation of the chlorinolysis reaction product of a 1,1-difluoroethane, said composition containing organic fluorine impurity in amount greater than 0.02% by weight of fluorine, which process comprises the procedure of forming vapors of said composition, condensing part of said vapors, and simultaneously contacting resulting condensate and uncondensed vapors with a silicic acid at about the atmospheric boiling temperature of said composition, and continuing said procedure for a time to effect interaction of said impurity with said silicic acid sufficient to effect ultimate reduction of said impurity content of said composition to less than 0.02% by weight of fluorine, separating said composition from said silicic acid, and distilling from the separated composition a purfied CCl$_2$=CCl$_2$ product containing less than 0.02% by weight of fluorine.

11. The process of purifying a composition comprising a chlorocarbon of the group consisting of CCl$_2$=CCl$_2$ and CCl$_4$ and containing organic fluorine impurity in amount greater than 0.02% by weight of fluorine, which process comprises contacting said chlorocarbon composition and said impurity with an aluminum silicate at temperature in the range of 60–150° C. for a time to effect interaction of said impurity with said aluminum silicate sufficient to effect ultimate reduction of said impurity content of said chlorocarbon to less than 0.02% by weight of fluorine, removing said aluminum silicate from said chlorocarbon composition, extracting said composition with an aqueous solvent and distilling from said composition a purified chlorocarbon product containing less than 0.02% by weight of fluorine.

12. The process of purifying a composition comprising a chlorocarbon of the group consisting of CCl$_2$=CCl$_2$ and CCl$_4$ containing organic fluorine impurity in amount greater than 0.02% by weight of fluorine, which process comprises contacting said chlorocarbon composition and said impurity with finely divided glass at temperature in the range of 60–150° C. for a time to effect interaction of said impurity with said glass sufficient to effect ultimate reduction of said impurity content of said chlorocarbon to less than 0.02% by weight of fluorine, removing said glass from said chlorocarbon composition, extracting said composition with an aqueous solvent and distilling from said composition a purified chlorocarbon product containing less than 0.02% by weight of fluorine.

13. The process of purifying a composition comprising a chlorocarbon of the group consisting of CCl$_2$=CCl$_2$ and CCl$_4$ containing organic fluorine impurity in amount greater than 0.02% by weight of fluorine, which process comprises contacting said chlorocarbon composition and said impurity with diatomaceous earth, at temperature in the range of 60–150° C. for a time to effect interaction of said impurity with said diatomaceous earth sufficient to effect ultimate reduction of said impurity content of said chlorocarbon to less than 0.02% by weight of fluorine, removing said diatomaceous earth from said chlorocarbon composition, extracting said composition with an aqueous solvent and distilling from said composition a purified chlorocarbon product containing less than 0.02% by weight of fluorine.

PATRICK ANTHONY FLORIO.
JOHN DOUGLAS CALFEE.

REFERENCES CITED

The following references are of record in the file of this patent:

UNITED STATES PATENTS

| Number | Name | Date |
| --- | --- | --- |
| 2,084,937 | Britton et al. | June 22, 1937 |